US008782872B2

(12) United States Patent
Lin et al.

(10) Patent No.: US 8,782,872 B2
(45) Date of Patent: Jul. 22, 2014

(54) MULTI-PIECE PIPING CONNECTOR USING GROOVES AND METHOD OF CONNECTING PIPE USING THE SAME

(71) Applicant: JM Eagle, Inc., Livingston, NJ (US)

(72) Inventors: Michael Lin, Livingston, NJ (US); Lei Zhang, Tianjia (CN)

(73) Assignee: J-M Manufacturing Co., Inc., Livingston, NJ (US)

( * ) Notice: Subject to any disclaimer, the term of this patent is extended or adjusted under 35 U.S.C. 154(b) by 0 days.

(21) Appl. No.: 13/644,011

(22) Filed: Oct. 3, 2012

(65) Prior Publication Data

US 2013/0026754 A1  Jan. 31, 2013

Related U.S. Application Data

(62) Division of application No. 12/516,531, filed as application No. PCT/US2007/085796 on Nov. 28, 2007, now abandoned.

(51) Int. Cl.
*B21D 39/04* (2006.01)
*F16L 55/00* (2006.01)
*F16L 25/00* (2006.01)

(52) U.S. Cl.
USPC ............ 29/508; 29/505; 29/506; 29/515; 29/516; 285/93; 285/330

(58) Field of Classification Search
USPC .................. 29/508, 506, 515, 234
See application file for complete search history.

(56) References Cited

U.S. PATENT DOCUMENTS

| | | | |
|---|---|---|---|
| 1,512,298 A | 10/1924 | Mueller | |
| 1,517,761 A | 12/1924 | Reed et al. | |
| 1,758,387 A | 5/1930 | Anderson | |
| 2,086,703 A * | 7/1937 | Eastman | 285/3 |
| 2,152,919 A | 4/1939 | Rheem | |
| 2,270,926 A | 1/1942 | Briegel et al. | |
| 2,614,304 A | 10/1952 | Oetiker | |
| 3,784,235 A | 1/1974 | Kessler et al. | |
| 3,893,718 A | 7/1975 | Powell | |
| 3,989,280 A | 11/1976 | Schwarz | |
| 4,011,652 A | 3/1977 | Black | |
| 4,030,850 A | 6/1977 | Hyde | |
| 4,221,407 A | 9/1980 | Steimle | |
| 4,538,837 A | 9/1985 | Cronk | |
| 4,779,902 A | 10/1988 | Lee | |
| 5,042,844 A | 8/1991 | Iida et al. | |
| 5,393,104 A | 2/1995 | Zornow | |
| 6,095,571 A | 8/2000 | Macduff | |
| 6,481,764 B1 | 11/2002 | Kwok | |

(Continued)

OTHER PUBLICATIONS

Canadian Intellectual Property Office, Office Action dated Oct. 1, 2010 for Application No. 2,670,630.

*Primary Examiner* — Alexander P Taousakis
*Assistant Examiner* — Matthew P Travers
(74) *Attorney, Agent, or Firm* — Duane Morris LLP

(57) ABSTRACT

A method to connect piping and a piping connection, having the features of a ring connector configured to snugly fit around an external diameter of a pipe; and a piping shield connected to the ring connector, the piping shield having at least one observation window cut into the shield, wherein the piping shield covers an abutment end of the pipe to be connected, wherein a joint between the ring connector and the piping shield forms a connection.

14 Claims, 4 Drawing Sheets

(56) References Cited

U.S. PATENT DOCUMENTS

| | | |
|---|---|---|
| 6,860,521 B2 | 3/2005 | Berg |
| 2003/0230132 A1 | 12/2003 | Bowles et al. |
| 2004/0211467 A1 | 10/2004 | Lechuga |
| 2005/0275221 A1 | 12/2005 | Rehder et al. |
| 2006/0151995 A1 | 7/2006 | Saarem et al. |

* cited by examiner

MULTI-PIECE PIPING CONNECTOR USING GROOVES AND METHOD OF CONNECTING PIPE USING THE SAME

CROSS-REFERENCE TO OTHER APPLICATIONS

This application is a division of pending U.S. patent application Ser. No. 12/516,531, filed Jul. 16, 2010, which is a national phase entry under 35 U.S.C. §371 of International Patent Application No. PCT/US07/85796, filed Nov. 28, 2007, which claims priority to Chinese Patent Application No. 200620150042.4, filed Nov. 28, 2006, the entireties of which are herein incorporated by reference.

FIELD OF THE INVENTION

The present invention relates to piping connections. More specifically, the present invention provides a piping connection that provides a secure connection between the individual piping sections to be joined.

BACKGROUND INFORMATION

Connection of piping is an important function in creating a piping system. Piping systems may be used for mass transport for materials, such as fluids and gases. These piping systems may be manufactured of differing materials such as, plastic, iron, copper or other similar materials.

Connection of piping materials can prove to be difficult. Conventional techniques include various crimping technologies that exert tremendous force upon the ends of piping but have a limited effect on providing a leak-free seal. Such connections often include provision of a spool piece inside the inner diameter of piping sections to be joined, wherein the outer piping system is then crimped around the spool piece to provide a mechanical connection.

Although well intentioned, the conventional techniques used for creation of piping connections have significant drawbacks. Such significant drawbacks can include inaccurate crimping of the piping system, thereby allowing fluids, such as liquids and gases, to escape from the piping system. Additionally, a significant drawback includes use of highly specialized tools to prevent significant over crimping of the piping system. The specialized tools are extremely expensive and cumbersome and cannot be used in tight quarters or in areas of limited accessibility. To overcome these significant drawbacks, other conventional techniques include soldering and\or welding of pipe sections together. While welding of the individual piping sections is an acceptable technique for providing a proper mechanical connection, the costs associated with welding of the piping system can be extremely high. Thus, when a significant number of welds is to occur in a piping system, such as in a new home placement, or in an industrial setting, the cost of piping insulation can skyrocket leaving the owner of the piping system with little alternative but to pay for expensive mechanical connections.

There is therefore a need to provide a mechanical connection that will connect different sections of a piping system.

There is a further need to provide a mechanical connection that will connect different sections of the piping system in an economical manner.

There is a still further need to provide a mechanical connection that may be installed in a piping system with a minimum of specialty tools.

There is still further need to provide a simple connection for use in a piping system that may be used by installers without the need for special training.

SUMMARY OF THE INVENTION

It is therefore an objective of an aspect of the present invention, to provide a mechanical connection that will connect different sections of a piping system.

It is also an objective of an aspect of the present invention to provide a mechanical connection that will connect different sections of the piping system in an economical manner.

It is a further objective of an aspect of the present invention to provide a mechanical connection that may be installed in a piping system with a minimum of specialty tools.

Is a still further objective of an aspect of the present invention to provide a simple connection for use in a piping system that may be used by installers without the need for special training.

The objectives of the present invention are achieved as illustrated and described. A piping connector is disclosed having the features of a ring connector configured to snugly fit around an external diameter of a pipe, and a piping shield connected to the ring connector, the piping shield having at least one observation window cut into the shield, wherein the piping shield covers an abutment end of the pipe to be connected, wherein a joint between the ring connector and the piping shield forms a connection.

In another exemplary embodiment of the present invention a piping connector is presented such that the connection formed between the piping shield and the ring connector is a groove arrangement.

In alternative embodiments, the piping connector may be made of plastic, copper or stainless steel materials.

The piping connector may have two observations windows to aid in identification of positioning of the piping connector.

The piping connector may also be constructed such that the piping shield has a front face that extends over the abutment end of the pipe.

The piping connector may also be configured such that the groove arrangement further comprises a first step, a depression and a second step on the ring connector, and a ring abutment end, a shield groove and a posterior end on the pipe shield.

In an alternative embodiment of the invention, a method is presented to connect at least two pieces of pipe wherein the method comprises: placing a piping connector over an abutment end of a first piece of pipe, inserting a spool piece into the abutment end; and crimping the piping connector to deform the piping around the spool piece, wherein the piping connector has a ring connector configured to snugly fit around an external diameter of a pipe, and a piping shield connected to the ring connector, the piping shield having at least one observation window cut into the shield, wherein the piping shield covers the abutment end of the pipe to be connected, wherein a joint between the ring connector and the piping shield forms a connection.

In another exemplary embodiment of the invention of the method provided, the connection between the piping shield and the ring connector is a groove arrangement.

In another exemplary embodiment of the invention, the method may be accomplished when the piping shield is made of plastic.

In another exemplary embodiment of the invention, the method may be accomplished such that a number of the observation windows is two.

In a still further exemplary embodiment of the invention, the method may be accomplished when the ring connector is made of stainless steel or copper.

In another exemplary embodiment, the method may be accomplished such that the piping shield has a front face that extends over the abutment end of the pipe.

In a stiff further exemplary embodiment of a method of the present invention, the groove arrangement may further comprise a first step, a depression and a second step on the ring connector, and a ring abutment end, a shield groove and a posterior end on the pipe shield.

In another exemplary embodiment of the present invention, the spool piece has a ridged surface.

DETAILED DESCRIPTION

Figure 1B:
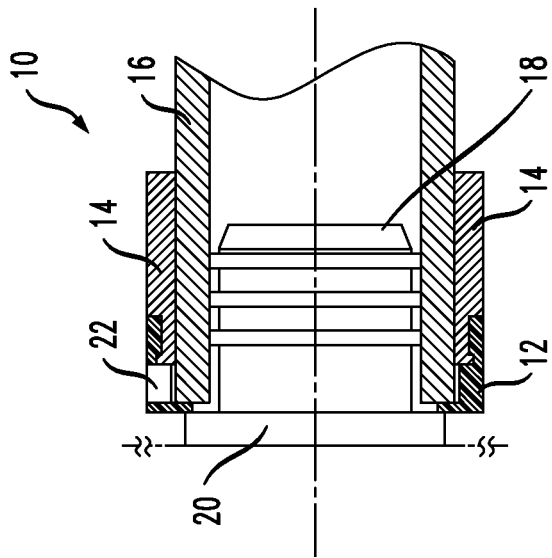
FIG. 1B is a side view of the piping connection of FIG. 1A in an installed condition on a pipe.
Figure 1A:
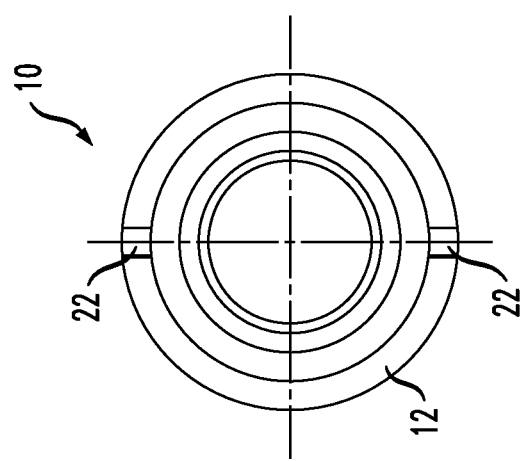
FIG. 1A is a front view of the piping connection installed on a piping system in accordance with an embodiment of the present invention.

Referring to FIGS. 1A and 1B, a piping connector 10 is provided. The piping connector 10 is used to connect multiple pieces of a piping system through the use of an inserted spool piece 18. In the exemplary embodiment, the inserted spool piece 18 is configured with a ridged surface. Other configurations such as a smoothed or patterned surface may be used. The piping connector 10 allows for connection of piping through deformation of the pipe 16 around the spool piece 18. The deformation allows for a friction increase between the spool piece 18 and the pipe 16, thereby preventing removal of the spool piece 18 from the pipe 16. In the illustrated embodiment, the spool piece is configured with ridges that will accept material from the pipe 16 during compression from a crimping tool, thereby allowing for a mechanical interlock between the pipe 16 and the spool piece 18.

The piping connector 10 is placed over an abutment end of a piece of pipe 16 to be connected. The outer spool piece section 20 is moved in relation to the pipe such that it contacts the piping shield 12, thereby creating a sandwich of material of the outer spool piece 20—piping shield 12—and pipe 16. To ensure that the piping connector 10 is fully inserted onto the abutment end of the pipe 16 an observation window 22 is provided that allows an installer to accurately locate the abutment end with relation to the inside of the piping shield 12. Once the installer identifies that the piping connector 10 is fully installed, the spool piece 18 is fully inserted through the front face of the piping connector 10. The front face of the piping connector 10 may be configured to overhang the abutment end of the pipe such that the pipe 16 is encapsulated on the outer diameter and the abutment edge.

Figure 2A:
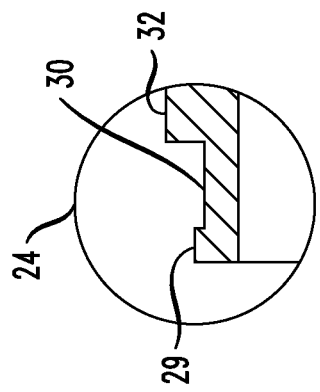
FIG. 2A is a front view of the ring connector of the piping connection of FIG. 1A.
Figure 2B:
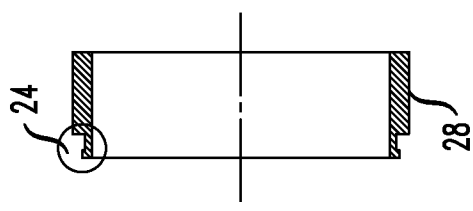
FIG. 2B is a side view of the ring connector of FIG. 2A.
Figure 2C:
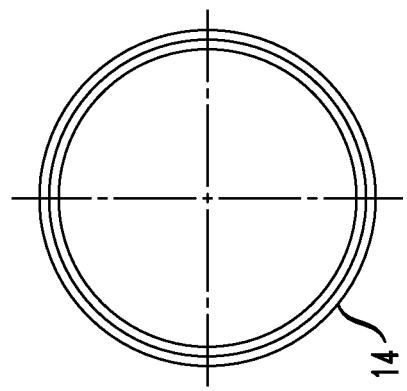
FIG. 2C is a exploded view of a groove of the ring connector of FIG. 2A.

Referring to FIGS. 2A, 2B and 2C, a ring connector 14 is illustrated. In FIG. 2A, the ring connector 14 is illustrated in a frontal position. In FIG. 2B, a ring connector is illustrated from a side position. In FIG. 2C, the groove arrangement 24 of the ring connector 14 is illustrated in exploded view. The purpose of the ring connector 14 is to allow a material to be crimped around the exterior diameter of a pipe 16 for ultimate connection to a spool piece 18. Thus, the ring connector 14 is provided with a first step 28 that allows for forces from a crimping tool to be applied to the ring connector 14 that are in turn transferred to the pipe 16 to be connected. To prevent marring of the pipe surface 16, the first step 28 is provided with a deformable material to allow the ring connector 14 to be collapsed around the exterior of the pipe 16. In the illustrated exemplary embodiment, the ring connector 14 is made of a copper material. Other exemplary embodiments allow for plastic or stainless steel materials. Adjacent to the first step 28 is a groove arrangement 24. In FIG. 2C, the groove arrangement 24 is provided in exploded view. An end to step 29 is first provided and is followed by a depression arrangement 30 followed by a second step 32. Thus formed, the groove arrangement 24 allows for a groove to allow interconnection to an alternate mating surface described later.

Figure 3A:
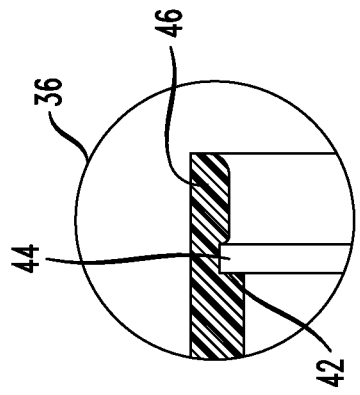
FIG. 3A is a front view of a piping shield of the piping connection of FIG. 1.
Figure 3B:
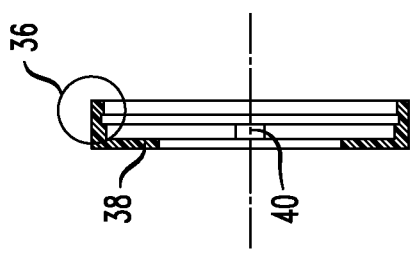
FIG. 3B is a side view of the piping shield of FIG. 3A.
Figure 3C:
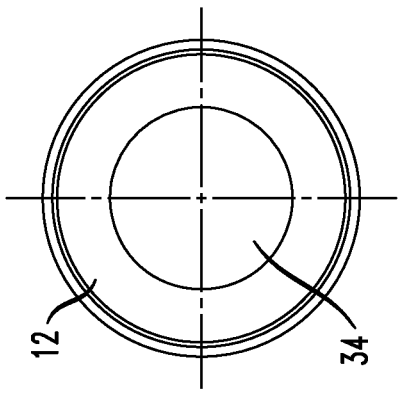
FIG. 3C is an exploded view of the connection section of the piping shield of FIG. 3A.

Referring to FIGS. 3A, 3B and 3C, a piping shield 12 is illustrated. The piping shield 12 is connected to the ring connector 14 to provide an entire piping connector 10. The piping shield 12 has an inner open diameter 34 that allows for insertion of the spool piece 18. Referring specifically to FIG. 3B, the piping shield 12 is located around a central axis 40. The piping shield is configured with a front face 38 for contact with the spool piece 18 previously described. The piping shield 12 is also configured with a mating surface 36. Referring to FIG. 3C, the mating surface 36 is configured with an abutment end 42 that in turn is connected to an area with a shield groove 44 that in turn is connected to a posterior end 46.

Figure 4B:
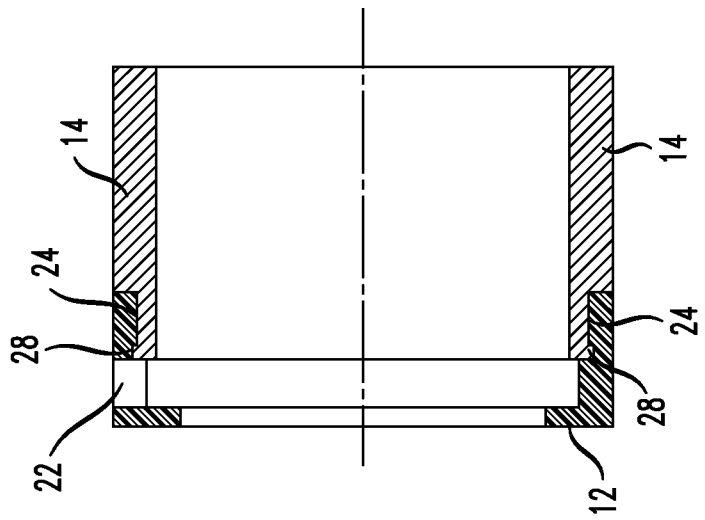
FIG. 4B is a side view of the piping connection of FIG. 1A in an uninstalled condition.
Figure 4A:
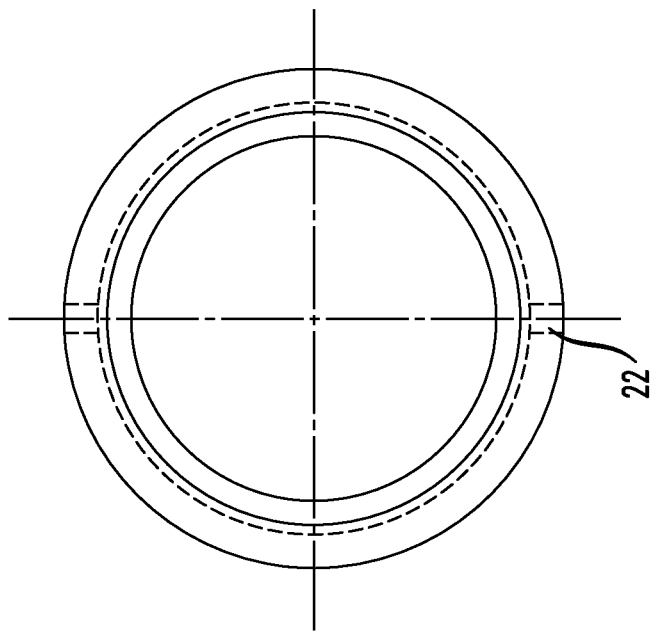
FIG. 4A is front view of the piping connection of FIG. 1A in an uninstalled condition.

Referring to FIG. 4, a completed piping connection 10 is illustrated in an uninstalled position. The piping connection 10 has the piping shield 12 connected to the ring connector 14 through the connection established through the junction of the abutment end 42, shield groove 44 and posterior end 46 of the piping shield 12 and the end step 29, depression 30 and second step 32 of the ring connector 14. The completed piping connection 10 has multiple numbers of observation windows 22 installed in the piping shield 12. In illustrated embodiment, two observation windows 22 are presented. Other numbers of observation windows are permitted to allow an installer to identify full insertion of a pipe 16 within the piping connector 10.

The present invention provides a mechanical connection that will connect different sections of a piping system. Although listed as connecting piping, other components, such as tubing as a non-limiting example, may be connected by the method and apparatus described. These connections can be through spool pieces such that two, three or other numbers of pipe can be connected to a central hub that provides the number of spool pieces required.

The present invention also provides a mechanical connection that will connect different sections of the piping system in an economical manner and eliminates the need for expensive welding of piping systems.

The present invention provides a mechanical connection that may be installed in a piping system with a minimum of specialty tools. A simple crimping device will allow for quick connection of spool pieces to the piping system, thereby economically saving installers economic expense.

The present invention also provides a simple connection for use in a piping system that may be used by installers without the need for special training, thereby allowing less skilled laborers the opportunity to quickly and efficiently install piping systems.

What is claimed is:

1. A method to connect at least two pieces of pipe, comprising:
   placing a piping connector over an abutment end of a first piece of pipe until an inwardly extending front face of a piping shield of the piping connector extends over, contacts, and covers the abutment end of the first piece of pipe;
   inserting a spool piece into an opening defined by the piping shield and into the abutment end of the first of pipe until an outwardly extending shoulder of the spool piece contacts the piping shield; and
   crimping the piping connector to deform the piping around the spool piece,
   wherein the piping connector has a ring connector configured to fit around an external diameter of a pipe and the piping shield has at least one observation window cut into the piping shield adjacent to the front face of the piping shield and at a location at which a connection is made between the piping connector and the piping shield.

2. The method according to claim 1, wherein the connection between the piping shield and the ring connector is a groove arrangement.

3. The method according to claim 1, wherein the piping shield is made of plastic.

4. The method according to claim 1, wherein a number of the observation windows is two.

5. The method according to claim 1, wherein the ring connector is made of stainless steel material.

6. The method according to claim 1, wherein the ring connector is made of copper.

7. The method according to claim 2, wherein the groove arrangement further comprises:
   a first step, a depression and a second step on the ring connector, and
   a ring abutment end, a shield groove and a posterior end on the pipe shield.

8. The method according to claim 1, wherein the spool piece has a ridged surface.

9. A method to connect at least two pieces of pipe, comprising:
   placing a piping connector over an abutment end of a first piece of pipe until an inwardly extending front face of a piping shield of the piping connector extends over, contacts, and covers the abutment end of the first piece of pipe;
   inserting a spool piece into an opening defined by the piping shield and into the abutment end of the first piece of pipe until an outwardly extending shoulder of the spool piece contacts the piping shield; and
   crimping the piping connector to deform the piping around the spool piece,
   wherein the piping connector includes a ring connector having a cylindrical body defining an internal diameter for fitting around an external diameter of the first piece of pipe, a first circumferential groove is defined by an external surface of the cylindrical body of the ring connector, the first circumferential groove is laterally disposed between a first step and a second step that orthogonally extend from the first circumferential groove, the first step extends from a first end of the ring connector to the first circumferential groove and has an outer diameter that is greater than an outer diameter of the first circumferential groove, and the second step has an outer diameter that is greater than the first step; and
   wherein the piping shield has a cylindrical body defining at least one observation window cut into the shield adjacent to the front face of the piping shield and at a location at which a connection is made between the piping connector and the piping shield, the piping shield defining a second circumferential groove around an interior surface, the second circumferential groove of the piping shield disposed between a posterior end of the piping shield having an inner diameter that is smaller than an inner diameter of the second circumferential groove of the piping shield and an abutment having an inner diameter that is smaller than the inner diameter of the posterior end, wherein the connection is formed when the first step of the ring connector is disposed within the second circumferential groove defined by the piping shield and when the posterior end of the piping shield is received within the first circumferential groove defined by the ring connector.

10. The method according to claim 9, wherein the piping shield is made of plastic.

11. The method according to claim 9, wherein a number of the observation windows is two.

12. The method according to claim 9, wherein the ring connector is made of stainless steel material.

13. The method according to claim 9, wherein the ring connector is made of copper.

14. The method according to claim 9, wherein the spool piece has a ridged surface.

* * * * *

UNITED STATES PATENT AND TRADEMARK OFFICE
CERTIFICATE OF CORRECTION

PATENT NO.         : 8,782,872 B2
APPLICATION NO.    : 13/644011
DATED              : July 22, 2014
INVENTOR(S)        : Michael Lin et al.

Page 1 of 1

It is certified that error appears in the above-identified patent and that said Letters Patent is hereby corrected as shown below:

IN THE CLAIMS:

Column 5, Line 17, please insert -- piece -- in between "first" and "of".

Signed and Sealed this
Twenty-first Day of October, 2014

Michelle K. Lee
*Deputy Director of the United States Patent and Trademark Office*